Oct. 4, 1966
J. B. FREED
3,276,739
PLUG VALVES
Filed Oct. 28, 1963
2 Sheets-Sheet 1
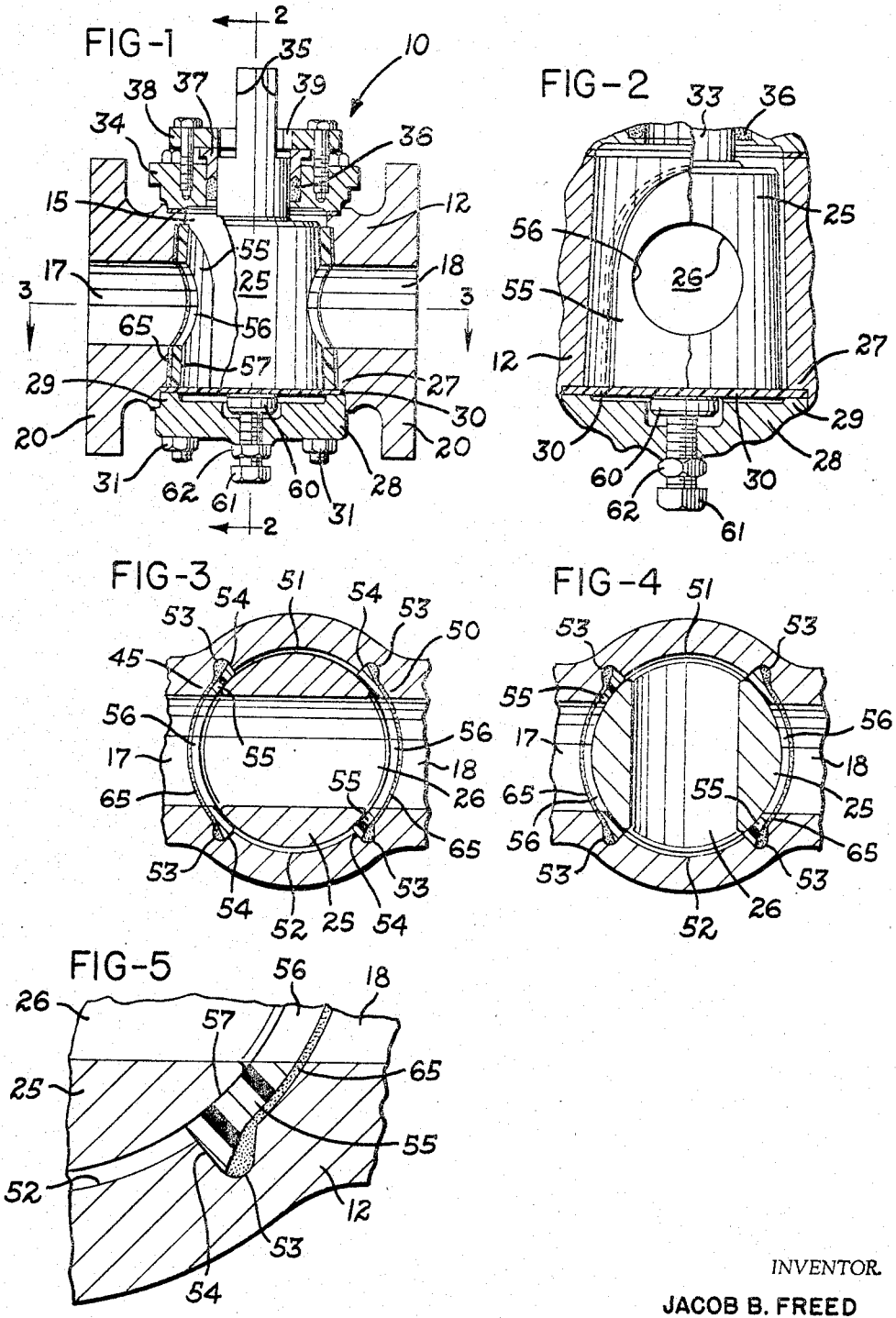
INVENTOR.
JACOB B. FREED
BY
Marechal, Biebel, French & Bugg
ATTORNEYS Oct. 4, 1966 J. B. FREED 3,276,739
PLUG VALVES
Filed Oct. 28, 1963 2 Sheets-Sheet 2
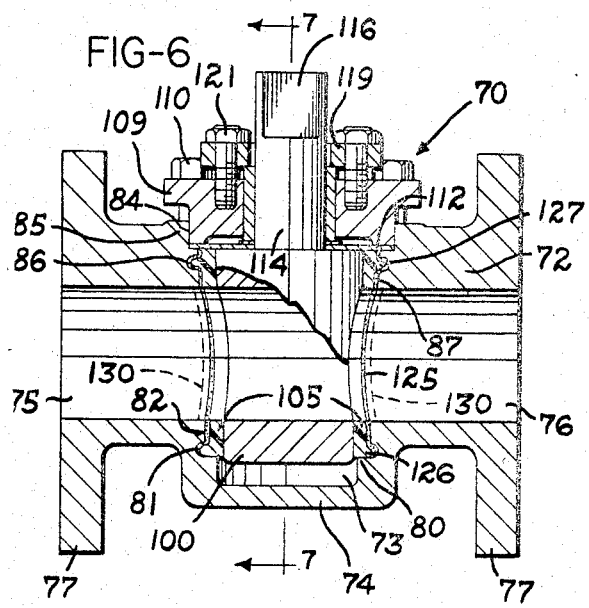
INVENTOR.
JACOB B. FREED
BY
Marechal, Biebel, French & Bugg
ATTORNEYS 3,276,739
PLUG VALVES
Jacob B. Freed, Dayton, Ohio, assignor to The Duriron Company, Inc., Dayton, Ohio, a corporation of New York
Filed Oct. 28, 1963, Ser. No. 319,338
12 Claims. (Cl. 251—314)

This invention relates to corrosion resistant plug valves having low turning torque.

Plug valves intended for use in systems handling corrosive fluids have been fabricated of corrosion resistant materials such as plastics of the epoxy resin or modified epoxy resin type such as that available under the trademark Durcon. Other corrosion resistant materials which may be similarly employed include glass and corrosion resistant metals or metal alloys such as those available under the trademarks Durco, Durichlor, Durimet-20 and Duriron, as well as metals such as stainless steel, aluminum and cast iron which do not offer the corrosion resistance of the aforementioned metals and alloys but which operate satisfactorily in certain applications. The above types of materials are characterized by the fact that they are generally shaped by a casting or molding operation often requiring a subsequent machining or grinding step to finish the interior bore of the body. Glass and the above mentioned metal alloys, Duriron and Durichlor, are characterized by a somewhat brittle nature which renders a machining operation quite difficult, and since any finishing operation generally involves grinding the surfaces of the valve body, such operations, especially grinding the interior of the valve body to relatively close tolerances, may require considerable manufacturing expense.

In an attempt to avoid the difficulty associated with the above materials, a second class of valves has been developed generally utilizing a machinable valve body having a liner or sleeve positioned between the bore and the plug of the valve. The sleeve or liner in such valves is usually a corrosion resistant plastic having a low coefficient of friction such as the polyethylene plastics or derivatives thereof and particularly the fluorocarbon resins of the type available under the trademark Teflon, Kel–F or F.E.P. Valves of this type are described, for example, in U.S. Patents 2,713,987; 2,728,550; 2,729,420; 2,776,104; 2,913,269; 2,961,214 and 2,987,295 all assigned to the same assignee as this application.

While the sleeve or lined valves described in the above patents operate satisfactorily insofar as corrosion resistance is concerned, certain difficulties must be overcome in the manufacture and servicing of such valves. For example, the liner or sleeve should be positioned within the bore so as to be non-rotatable and preferably should be maintained in a confined condition so as to minimize the effects of cold flow. Flow or distortion of the liner may also occur when sleeve valves are exposed to a temperature cycle, that is, if the temperature is elevated to a high degree and then lowered again, the expansion and contraction of the valve liner may cause the valve to leak.

Satisfactory results from the standpoints just discussed have been obtained by a sizing operation in which the liner is fitted within the bore of the valve and maintained in confined condition such that cold flow, or flow thereof resulting from the temperature cycling operation is substantially eliminated. Such a sizing operation is described for example in Patent 2,961,214, previously mentioned and involves the use of axial force to position the liner within the valve bore. Due to the pressure created along the surface of the wall of the bore, the body of the valve must be capable of withstanding considerable pressure, and materials which are brittle such as glass or the metal alloys previously described may not be readily utilized in such a construction. A similar sizing operation is required if the liner sleeve should require replacement, which increases the cost of servicing such valves.

These valves are also characterized by the fact that the bore and/or plug thereof is tapered so that a small longitudinal force on the plug creates substantially high radial pressures which effect a seal between the plug, sleeve and bore of the body, and which operates to seat the sleeve or seal means in the bore. Generally, these valves are so constructed that the relative taper of the bore and/or plug is in the order of between about 1° and 5° on a side, which is in the range of Morse tapers and the like wherein a gripping and non-rotating action is developed. The low coefficient of friction of the seal member or sleeve, and the polished surface of the plug allow movement of the plug relative to the sleeve, and the torque required to turn the one part relative to the other is a function of the size of the valve, the area of contact between the movable parts, and the friction between them resulting from the radial pressure created by the axial force on the plug.

In lined valves, or those having seal elements only in the area of the ports, as disclosed for example in co-pending application Serial No. 217,884, filed Aug. 20, 1962, now abandoned, and assigned to the same assignee, the radial pressure is sufficient both to maintain the seal element in fluid sealing relation with the movable surface, usually the plug, and to maintain the seal element in direct and fluid tight engagement with that member with respect to which it is stationary, usually the bore. It has been discovered, in accordance with the present invention that a relatively high radial pressure is required to establish both of these seals, and the inherent locking or gripping action which occurs with tapers in the range of Morse tapers gives rise to relatively high turning torque particularly in the case of plug valves of the larger sizes, for example, 2 inches through 12 inches and higher. A somewhat lesser radial pressure may be used if a fluid tight seal is to be established between the seal element and the member which is movable with respect thereto since it may be necessary to deform or compress the seal member in order to establish a seal between it and the member with respect to which it is stationary.

The present invention contemplates applying an axial force to the plug to create a radial pressure insufficient per se to establish a fluid tight seal between the seal element and the surface with respect to which it is stationary but sufficient to establish a seal between the seal member and the surface which is movable relative thereto. The seal face between the relatively stationary surface and the seal element is provided by a corrosion resistant and elastically compressible sealant material interposed between these surfaces, and thus the plug need not exert pressure sufficient to establish this seal thereby reducing the torque between the relatively moving parts. For example, a four inch and six inch sleeve lined valve may have a turning torque of between 150 to 180 foot pounds, and about 460 foot pounds, respectively while the same sized valves constructed in accordance with the present invention have turning torque of about 25–30 foot pounds for a four inch valve and 50–60 foot pound for a six-inch valve.

This invention has for its primary object the provision of an improved corrosion resistant plug valve of relatively low turning torque and which is relatively easy to manufacture and repair.

Another object of the present invention is the provision of a corrosion resistant plug valve wherein there is a clearance between the bore member and the plug member, and wherein a corrosion resistant low coefficient of friction seal element is mounted in stationary relation to one of the members and movable with respect to the other, the plug of the valve being urged into the bore with a force insufficient to establish a seal between the seal element and the surface with respect to which it is stationary, but sufficient to establish a seal between the movable member and the seal element, thereby reducing the torque, the seal between the seal element and the relatively stationary member being established by a compressible corrosion resistant sealant.

Still another object of the invention is the provision of a plug valve of reduced turning torque wherein the plug of the valve is engaged by spaced corrosion resistant members having a relatively low coefficient of friction with respect to the plug, the members being maintained in a confined condition within the bore of the valve for minimizing the effects of cold flow, and a corrosion resistant sealant being interposed between the member and the bore for establishing a seal therebetween, and the plug being maintained in the bore to create a radial force sufficient to establish a seal between the surface of the plug and the members.

Another object of the present invention is the provision of a corrosion resistant plug valve wherein a pair of fluorocarbon resin plastic inserts are so received within a pair of recesses in the bore that the plug of the valve is maintained in spaced relationship to the bore thereby eliminating machining and grinding operations thereof, and wherein a seal is maintained between the inserts and the bore by an elastically compressible sealant while the radial pressure of the plug establishes a seal between the plug and the inserts thereby reducing the turning torque of the plug with respect to the body.

A further object of the invention is to provide a low turning torque plug valve having a seal member of fluorocarbon material received within the bore and between the bore and the plug, wherein the seal member is stationary with respect to the bore and sealed thereto by an elastically compressible sealant including a fluorocarbon material, the seal member being maintained in sealing relation to the body by the radial pressure created by the plug in a relatively tapered bore.

It is a further object of the present invention to provide a plug valve of the type described having a seal member which is a sleeve of polytetrafluoroethylene received within the bore and between the bore and the plug, the sleeve being sealed to the bore by an elastically compressible sealant including a finely divided polytetrafluoroethylene material therein, the seal between the sleeve and the plug being established by the radial pressure of the plug thereagainst which is insufficient to seal the sleeve against the body in the absence of the sealant, thereby providing relatively easy movement of the plug relative to the sleeve for reducing the turning torque of the valve.

Other objects and advantages of the invention will be apparent from the following description, the accompanying drawings and the appended claims.

In the drawings:

FIG. 1 is a view partly in section and partly in elevation of an improved low torque plug valve constructed in accordance with the invention and showing the plug in the open position;

FIG. 2 is a section on the line 2—2 of FIG. 1 with portions of the plug broken away showing a portion of an insert which is received within the bore of the valve;

FIG. 3 is a section on the line 3—3 of FIG. 1 showing the relationship of the plug, inserts, sealant, and the bore with the plug in open position;

FIG. 4 is a view similar to FIG. 3 showing the plug in the closed position;

FIG. 5 is an enlarged fragmentary view showing the details of the relationship between the plug, insert, sealant and body of a valve constructed in accordance with the present invention;

FIG. 6 is a view partly in section and partly in elevation showing another form of low torque plug valve in accordance with the present invention, wherein the seal member is in the form of a sleeve-liner;

FIG. 7 is a view partly in section and partly in elevation taken along the lines 7—7 of FIG. 6;

FIG. 8 is a fragmentary view taken along the line 8—8 of FIG. 6;

FIG. 9 is an enlarged fragmentary view of a portion of the valve structure shown in FIG. 8; and FIG. 10 is a fragmentary sectional view of a valve constructed in accordance with the present invention and incorporating a downstream throttling principle.

Referring to the drawings, which illustrate preferred embodiments of the invention, the valve 10 shown in FIGS. 1 to 5 includes a valve body 12 having a conical bore 15 extending transversely therethrough from the top of the body and preferably tapered between 1° and 5° on a side. It should be noted that the term "bore" is used to identify the cavity within the body and does not necessarily mean that this portion of the body is formed by boring or other machining operations. Ports 17 and 18 open into the bore 15 from opposite sides of the valve body, and flanges 20 are provided at the outer ends of the ports for attachment to pipes in the conventional manner.

Positioned within the bore 15 is a valve plug 25, preferably tapered an amount corresponding to that of the bore although the bore and plug may be differentially tapered, and having a radial dimension which is sufficiently smaller than the radial dimension of the bore so as to establish an annular clearance therebetween. The plug 25 includes a through port 26 adapted for alignment with the body ports 17 and 18. The lower end of the valve body 12 is provided with a circumferential shoulder 27 to receive a cap 28 which includes a boss portion 29 received within the recessed shoulder 27. Between the boss and the shoulder there is positioned a sealing diaphragm 30 which is secured in position on the body 12 by a plurality of bolts 31 in the usual way.

The smaller end of the plug 25 includes a stem portion 33 which projects through a retainer 34 mounted similarly to the cap 28 on the body 12, and the outer end of the stem 33 is provided with flats 35 on each side thereof for interlocking engagement with an operating handle in the usual way. The retainer 34 supports a sealing ring 36, gland 37 and gland follower 38, and the gland follower 38 includes a shoulder 39 adapted for engagement by the flats 35 on the stem 33 to limit turning movement of the plug 25 to 90° thereby to define the opened and closed positions of the valve. The retainer 34 also cooperates with a gasket 40 to seal the upper end of the body 12.

As shown in FIGS. 1–3 for example, means are provided in the bore of the valve defining recesses 45 and 50 which surround plug ports 17 and 18 respectively, to form spaces or pockets within the bore which have radial dimensions greater than the radial dimensions of the non-recessed areas 51 and 52. Each of the pockets or recesses includes an expansion chamber 53 which preferably communicates with each pocket and an associated radially extending peripheral wall 54, whose functions will be described more fully hereinbelow. Received within each recess is a plastic insert or member 55 having a port 56 therein matching the body port to allow flow of fluid through the valve when the plug is in the open position as illustrated.

Each of the inserts 55 includes an inner sealing surface 57 which engages the plug along a portion of the outer surface thereof and which surrounds the plug port when the plug is in the open position. These inserts are so dimensioned with respect to the plug ports that as the plug is rotated to the closed position as shown in FIG. 4, a sufficient quantity of material is present to engage the surface of the plug between the ports thereof in sealing engagement. The thickness of the members or inserts 55 is greater than the annular clearance between the plug and bore as will be understood with reference to FIG. 5, since the radial dimension from the center of the bore to inner sealing surface 57 of the insert 55 is less than the radial dimension to the outer surface thereof. As hereinafter employed, the term thickness is utilized to identify the difference in these radial dimensions.

The recesses 45 and 50 are formed only along a portion of the periphery of the bore 15 and only along a portion of the axis of the bore, as seen in FIGS. 1 and 2, and the surface area of the insert is coordinated and correlated to engage a minimum area of the outer surface of the plug to provide for a relatively low turning torque while maintaining an efficient seal between and around the plug ports. As shown, the insert engages the surface of the plug only along a portion of the periphery and a portion along the axis thereof. Additionally, the thickness of the inserts is preferably such as to maintain the plug in spaced relationship to the non-recessed sections of the bore thereby eliminating any requirement for grinding or machining the bore surface as will be described more fully hereinbelow.

Adjustable pressure is maintained on the larger end of the plug at the base of the valve through diaphragm 30 by means of a thrust member 60 and a pressure screw 61 threaded through the cap 28. A lock nut 62 is provided to lock the screw 61 once the proper axial pressure has been applied to the plug. The application of axial force to the plug results in the generation of a force vector directed radially outward of the center of the plug.

In accordance with the present invention, a sealant 65, shown as the stippled section, is placed between the insert and that member with respect to which the insert is stationary, preferably the bore. A sealant which has been found acceptable includes a mixture of finely divided polytetrafluoroethylene and a surfactant or wetting agent such as isooctyl phenylpolyethoxy ethanol, each of the components being present in an amount sufficient to form a paste like mixture. When applied to the stationary surface, the mixture dries and forms a heat and chemically stable elastically compressible low coefficient of friction material between the insert and the bore to provide a seal therebetween. Other materials which may be employed include corrosion resistant materials such as polyethylene, polypropylene, fluorinated elastomers and the like preferably in finely divided or comminuted condition and suspended in a material capable of causing adhesion of the corrosion resistant material to a glass or metal surface.

The recesses, to which the sealant 65 is applied are of such a configuration that as the axial force is applied, the insert will not move radially because of the radially extending peripheral wall 54 which also prevents axial movement in the direction of the smaller end of the valve bore. Axial movement of the inserts in the other direction, that is, toward the larger end of the plug, is prevented by the boss portion 29 of the cap 28 which cooperates with the diaphragm 30 to maintain the inserts properly aligned axially within the bore and in a confined condition within each pocket.

The inserts 55 may be fabricated of a corrosion resistant and relatively chemically inert plastic material which provides a low friction surface with respect to the surface of the plug. Satisfactory results have been achieved in accordance with the invention with polyethylene resins or derivatives thereof such as the fluorocarbon resins previously mentioned. In the case of polytetrafluoroethylene, highly satisfactory results have been achieved and the difficulties associated with cold flow have been substantially eliminated by maintaining each of the inserts in a confined condition within the valve.

The advantages provided by the present invention may be understood with reference to the fabrication and assembly procedure of the valve parts as now described. The valve body may be formed by a casting or molding operation so as to include recesses surrounding the body ports and having a radially extending peripheral wall, as well as inlet and outlet ports as previously described. It is preferred that materials such as the corrosion resistant materials previously mentioned be utilized as the valve body. An important advantage of the invention is that relatively brittle alloys or materials may be utilized as the valve body while eliminating the necessity of machining or grinding operations which might otherwise be necessary to provide a relatively smooth bore for receiving a liner.

Following the formation of the body, the sealant is applied to the portions thereof constituting the pocket, and the sealant may be applied by brushing and the like, and allowed to dry until it becomes dried, or tacky. One or more coats of the sealant may be applied as desired, and in the case of "rough cast" bodies, it is preferred to apply a coating in the order of 2 to 30 mils thickness so as to provide sufficient material which may subsequently be displaced, if necessary, to fill substantially all of the space between the stationary surface and the mating surface of the seal element.

The insert blank may be manually deformed sufficiently to conform generally to the configuration of the recesses. Thereafter, the insert blank is placed within the recess and against the sealant and a valve plug inserted into the bore. As already noted, the plug is dimensioned with respect to the bore to provide an annular clearance therebetween, and the inserts are so dimensioned with respect to the valve body and the plug that the thickness thereof is greater than the dimension of the annular clearance so that the plug is maintained out of contact with the non-recessed areas of the bore. In this way, a machining operation, or a grinding operation in the case of the more brittle materials, is rendered unnecessary since the bore body and the plug are not in contact.

After the plug is in place, the remaining subassemblies may be attached to the valve body including the retainer unit and associated packing as well as the cap assembly and the thrust member. The thrust member 60 is then adjusted to apply an axial force to the plug resulting in a radial force being applied to the inserts which accomplishes proper seating of the inserts within the respective recesses and against the sealant and establishes a seal between each insert and plug. Following this operation, the port 56 is cut through each of the inserts to provide communication between the plug port and each of the body ports.

The significant advantages achieved by the present invention include ease of manufacturing of the valve due to elimination of costly machining or grinding operations thereby allowing the valve bodies to be formed by a relatively simple casting or molding procedure. Thus it is possible to form the valve body of corrosion resistant materials which are inherently brittle, for example the alloys previously mentioned as well as plastics and glass materials. Since the plug surface is engaged at spaced intervals by the insert members, the result is that a lower surface area of the plug is in contact with the resinous material resulting in considerable reduction in the torque required to turn the valve from one position to the other.

Since the axial force on the plug need not be sufficiently high to establish a seal between the insert and the body, or the seal member and that surface with respect to which it is stationary, because the seal between these two members is provided by the sealant 65, the applied radial force is sufficient only to seal the plug relative to the inserts. Accordingly, the axial force applied to the plug and transmitted to the body as a radial force is, in accordance with the present invention, less than the force needed if no sealant were used. This substantially reduced force reduces the frictional engagement between the relatively movable parts, that is the plug and inserts, and thus reduces the torque required to start the plug turning relative to the body. For example, a two-inch valve requires 30 foot pounds of torque to "break" the valve and 23 foot pounds to rotate the plug while the same size and design of valve using a sealant in accordance with the present invention requires only 12 foot pounds of torque to break and 10 foot pounds to turn. The two-inch test valve had a seal limit of a surface area of 3.9 square inches and was capable of holding approximately 140 p.s.i. In the case of three-inch valves, three test valves were assembled, one with inserts, a second with a sealant and a third with a sealant wherein the insert and sealant were heat sized into place by use of a dummy plug and heating the thus assembled valve at a temperature of 325° F. After the heat sizing operation a conventional plug was inserted into valve number three. All three valves were adjusted to hold 300 p.s.i. pressure, and the first valve had a break torque of 75 foot pounds and a turning torque of 60 foot pounds, while the second and third valves had a turning torque of 5 to 10 foot pounds. Additionally, valves two and three were heat cycled up to a temperature of 450° F. before any adjustment was needed to provide a leak-proof valve. This low torque enables the valves of the present invention to be used with glass pipe and thus minimizes the possibility of fracturing or damaging the pipe when rotating the valve from one position to the other. Additionally, the low turning torque allows the use of automatic actuation devices for turning the plug from one position to the other. This particular feature is a definite advantage in the case of valves of larger size, for example ten- and twelve inch valves.

The tendency of the fluorocarbon resin materials to cold flow or deform under an applied load has been minimized and substantially eliminated in accordance with the present invention by use of an insert which is maintained in a confined condition between the valve body, the peripheral wall and the plug. By maintaining the inserts in a confined condition, the plastic material will not deform permanently at high temperatures. Additionally, the provision of the expansion chamber 53 operates to prevent the resin material from extruding along the longitudinal axis of the valve during temperature cycling, and the confined condition of the insert within the recess and between the valve bore and the plug cooperate to provide an insert which is dimensionally stable for relatively long periods of time thereby decreasing the frequency of service and leakage. In the event that replacement or repair of insert members is required, this may be accomplished easily by disassembling the valve, removing the old inserts, and applying the sealant and inserting new inserts.

The principles of the invention may also be applied to valves of the fully lined or sleeve type wherein the body is fabricated of a relatively strong material which offers limited corrosion resistance. Referring to FIGS. 6 to 9, the valve 70 includes a valve body 72 having a conical bore 73 extending transversely therethrough from the top of the body and having its bottom end closed by an integral portion 74 of the body. Ports 75 and 76 open into the bore 73 from opposite sides of the valve body, and flanges 77 are provided at the outer ends of the ports for attachment to pipes in the usual way.

Referring particularly to FIG. 7, an annular shoulder 80 is provided at the lower end of the bore 73 which is preferably tapered in the amount previously described, and the inner diameter of this shoulder is appreciatively less than the minimum diameter of the tapered portion of the bore. Above this shoulder 80, the surface of the bore is provided with a groove 81 which is preferably continuous and of substantially greater diameter than the portion of the bore surface immediately thereabove, and it will be seen that this arrangement of the groove 81 provides a continuous land portion 82 extending around the lower end of the tapered surface of the bore. By way of illustrative examples, satisfactory results have been obtained with the groove 81 having a depth of .125 inch.

At the top of the valve body 72, there is a counterbore 84 terminating in an annular shoulder 95, and spaced below this shoulder is a second circumferential groove 86 similar to the groove 81. Immediately below this groove 86 is a circumferential land portion 87 of the bore surface similar to the land portion 82 adjacent the lower end of the bore and similarly extending continuously around that surface of the bore. The spaced groove operates as locking means preventing axial movement of the liner due to temperature cycling, while circumferential lands cooperated with the sleeve and plug to provide the spaced high pressure seal areas above and below the body ports.

The surface area of the bore between the land portions 82 and 87 and between the ports thereof is provided with a plurality of indentations or pockets 90 and 91 which may be of the same depth as the grooves 81 and 86 as compared with the adjacent surface portions of the bore. The pockets 90 and 91 are bordered by the lands 82 and 87 additional land portions 92 and 93 which encircle the ports 75 and 76, and rib portions 94 of the bore surface which resemble a lattice, and operate to provide pockets in the bore between the ports thereof and high pressure seal areas which surround the ports, the pockets also serving to prevent movement of the liner with respect to that surface in which the pockets are formed.

The tapered valve plug 100, FIGS. 6 and 7 is of sufficiently smaller radial dimensions than the bore 73 to establish an annular clearance therebetween which is filled by a liner sleeve 105 providing a seal between the mating surface of the sleeve and the plug, and the plug includes a through-port 106 adapted for alignment with the body ports 75 and 76 and matching liner ports 107 and 108. The upper end of the valve body 72 is closed by a cap 109 secured to the body by screws 110 and the inner portion of the cap is sealed on the shoulder 85 through an annular thrust diaphragm 112. The plug 100 includes a stem 114 which projects through the cap 109 and is provided with flats 116 on each side thereof for interlocking engagement with an operating handle in the usual way. Sealing pressure of the plug with the sleeve 105 is maintained by means of a gland 117 which engages the upper surface of the plug through the diaphragm 112 and is forced against the plug by the gland follower 119 adjustably secured to the cap 109 by screws 121.

As was the case with valve construction shown in FIGS. 1 to 5, a sealant 125 is interposed between the sleeve and the body bore for providing a seal therebetween, while the radial force of the plug is sufficient to effect a seal between the plug and the liner but insufficient to expand the sleeve radially, and in the absence of the sealant to urge the liner into intimate sealing engagement with the bore. As radial pressure is increased by adjustment of the gland, the plug moves axially downward into the bore expanding the sleeve against the elastically compressible sealant which is more easily compressed to provide a seal than may be accomplished by radially expanding the sleeve and compressing it between the bore and the plug. This substantial difference in radial pressure between a plug valve including a sealant in accordance with the present invention and one which does not include a sealant results in a marked difference in the turning torque of the valve. For example, a six-inch valve including a liner sleeve without a sealant interposed between the body and sleeve has a turning torque of about 400 foot pounds, thereby requiring a gear arrangemnet to rotate the plug from one position to the other, or rendering it quite difficult to operate the valve with a relatively simple automatic actuation. The same size valve using the sealant in accordance with the present invention had a turning torque of between 50 to 60 foot pounds and maintained a relatively low torque at pressures up to above 300 p.s.i.

With this significant and substantial reduction in torque, gear assemblies are eliminated in the larger size valves, and because of the low torque, it is now possible to utilize automatic actuation thereby providing remote control of the valve. Additionally, the sealant in addition to reducing the turning torque also decreases and substantially eliminates any in line leakage which may tend to occur. The presence of a sealant substantially eliminates any corrosive material from being trapped between the back side of the liner sleeve and the mating surface of the bore, and this represents a definite advantage in the case of valves which are used in different service, for example, organic materials one day and strong oxidizing materials the next. In accordance with the present invention, the sealant prevents passage of fluid between the seal member and the stationary surface while simultaneously reducing the turning torque by reducing the friction between the seal surface and the movable member.

Satisfactory results have been obtained in the manufacture of valves constructed as shown in FIGS. 6–9 by rough casting the body with the bore 73 of the surface characteristics described and without finish grinding except for the shoulder 85. The liner sleeve 105 is fabricated to the approximate dimensions required in the finished valve but with some excess thickness of material which is eliminated during assembly as described hereinafter. As already indicated, preferred results are obtained with the liner sleeve fabricated from polytetrafluoroethylene granular molding powder by preforming, sintering at a temperature of the order of 700° F. and then coining to restore the preformed shape.

The advantages provided by the invention in the finished valve are achieved by assembling and conditioning the valve parts by the following method steps:

(1) The bore of the body is coated with a sealant, preferably of the type described, to provide an elastically compressible coating on the surface of the bore.

(2) The coined sleeve is pressed into the valve body until its lower end seats on the shoulder 80.

(3) The sleeve is then subjected at room temperature to a sizing operation by pressing into the body a plug of the same contour as the plug 100 but preferably having no port therethrough so that it is in effect a blank plug, and the plug is pressed into the body to a predetermined position which is slightly short of the final position of the plug 100 wherein its port 106 is in alignment with the body ports. During this step, some portion of the material of the liner sleeve will be forced by cold flow to enter the grooves 82 and 87, the pockets 90 and 91, and also the body ports 75 and 76, and there may be some flow of the sealant 125.

(4) The blank plug is replaced by the plug 100 to be used in the finished valve. This step is optional in that the subsequent two steps can be advantageously carried out with the blank plug in the assembly, but for convenience in mass production it may not be economically practical to have as many blank plugs as there are valves in production at a given time.

(5) The assembled body, plug and sleeve, with the cap assembly adjusted to hold the plug in the specified predetermined position, are then heated at a predetermined temperature until the entire assembly has reached that temperature. The temperature reached in this step is preferably substantially less than the sintering temperature for the sleeve material but substantially higher than the maximum temperature to which the finished valve is expected to be subjected during use. During this step, and owing to the substantially higher coefficient of thermal expansion of the Teflon material, the sleeve will be forced to flow in all possible directions in order to relieve the excess pressure thereon created by its confinement between the plug and body, and it will therefore flow into all of the grooves and indentations in the bore as well as the body ports and to a limited extent beyond the shoulders 80 and 85. This condition is illustrated in FIG. 6 by the rib portions 126 and 127 in the grooves 81 and 86, the portions 129 in FIG. 7, and the portions 130 shown in dotted lines in FIG. 6.

(6) The assembly is then removed from the oven and permitted to cool to room temperature without adjustment of the plug. During this step, the sleeve will tend to contract to its original dimensions, but it will to a major extent be held against such contraction by reason of the rib portions 126 and 127 thereof which are interlocked with the grooves 81 and 86, and also by the portions 130 which have expanded into the body ports and the pockets 90 and 91.

(7) The plug is removed from the body, and while this step is easier if a blank plug was used during step 5, it is relatively easy even if the regular plug had been used owing to the fact that the major flow of the sleeve material 130 is outwardly into the body ports 75 and 76 rather than into the plug port. This sleeve material is then cut out from within the body ports, and also any excess material which may have flowed beyond the shoulder 85 is trimmed away.

(8) The regular plug 100 is inserted in the body, the top cap assembly is applied, and the plug is forced to its final position within the body, that is in sealing relation with the sleeve 105 and slightly compressing the sealant 125 to effect a seal between the sleeve and the body.

A major advantage of the method and product of the invention lies in the establishment of continuous bands of high pressure sealing action which encircle each of the body ports and also each end of the bore and which cooperate with the sealant to provide a low turning torque of the plug relative to the sleeve. More specifically, it will be apparent that the thickness of the sleeve is at a minimum in the portions which overlie the respective lands 82, 87, 92 and 93, and the tensioned stresses therein are therefore at a maximum at lower temperatures. Furthermore, since these lands are completely interrupted at each end of the bore by the grooves 81 and 86, the sleeve material is held against axial movement through these areas as the temperature changes so that full sealing is assured at all points in the desired operating range and temperatures.

The pattern of indentations 90 and 91 and the ribs 94 is of importance in several respects in achieving the results of the invention. In the first place, they supplement the action of the grooves 81 and 86 in holding the liner sleeve against expansion and contraction, and they also lock the sleeve against angular movement in the bore as the plug turns. Thus at room temperature, the sleeve material which overlies and projects into these indentations will be under substantially less stress than the material overlying the lands 82, 87, 92 and 93, and it absorbs some of the stresses effective on those portions of the sleeve as the temperature increases. Another important result of this condition is the relief of the torque required to turn the plug, since the sealing pressure across the several indentations is substantially less than across the other portions of the bore, and which cooperate with the sealant and the reduced pressure of the plug to provide a plug valve construction having a sleeve therein which has a substantially reduced turning torque.

The valve 131 shown in FIG. 10 incorporates the downstream throttling principle described in detail in U.S. Patent 2,987,295, assigned to the same assignee as this application, and includes a body 132, sleeve 133 and a plug 135, all assembled in the same general relationship already described in connection with the valve of FIGS. 6 to 9. The plug and valve body are so constructed that in moving from the open to the closed position, the interior of the plug port 136 is maintained in direct fluid receiving relation and under the same pressure conditions as the inlet port 137 of the valve body thereby maintaining the liner sleeve in contact with the body to prevent snagging of the sleeve by the plug as it moves to the closed position.

Interposed between the liner 133 and the body 132 is a sealant 140 of the type previously described and which operates to provide a seal between the liner sleeve and the bore and which therefore requires less axial force and radial pressure to maintain the body plug and liner in sealed relationship. The body also includes the pockets 141 and grooves and lands, not shown, but previously described in connection with the valve of FIGS. 6 to 9.

Valves constructed in accordance with the present invention offer the advantage of a low turning torque valve wherein leakage between the sleeve and the body is substantially eliminated by the use of a sealant, and wherein the sealant provides an elastically compressible medium between the body bore and the seal member. A valve construction incorporating inserts as described is relatively easy to manufacture and service since the inserts may be positioned within the recesses provided within the bore without any sizing operation. In this way, a number of advantages are achieved from the manufacturing standpoint among which is that the valve bodies may be fabricated of relatively brittle materials offering a high degree of corrosion resistance and wherein the interior portions of the bore of the valve need not be machined accurately or subjected to a grinding operation as may be necessary with valves of the prior art. The use of a sealant, in addition to the other advantages previously noted also provides the advantages of substantially filling the pits and depressions of the bore in a cast valve body thereby rendering it unnecessary to force the seal member tightly into engagement with the bore. The single or multiple coats of a sealant effectively smooths the bore, and when compressed by the seal member, the sealant will compress and flow sufficiently to provide a seal and reduce the radial force necessary to maintain the seal element in fluid tight engagement with the bore.

Valves constructed in accordance with the invention also are capable of being exposed to temperature cycling as may occur during a cleaning operation wherein steam under high pressure is run through the valve for cleaning purposes without loss of effectiveness. Since the seal member, be it an insert or sleeve, is maintained in a confined condition as previously described, effects of cold flow or deformation are minimized and the useful life of the valve extended.

While the forms of apparatus and the method herein described constitute preferred embodiments of the invention, it is to be understood that the invention is not limited to these precise forms of apparatus and method, and that changes may be made therein without departing from the scope of the invention which is defined in the appended claims.

What is claimed is:

1. A plug valve for corrosive fluids and the like comprising a valve body including means defining a bore and ports opening into said bore in angularly spaced relation, a valve plug rotatably mounted in said bore and having a passage therethrough adapted for alignment with said body ports, operating means for rotating said plug selectively between open and closed positions, said plug being of sufficiently smaller radial dimension than said bore to establish an annular clearance space between the mating surfaces of said plug and of said bore, at least one of said mating surfaces being tapered in the order of 1° to 5° to provide for variation of said clearance space in response to appropriate movement of said plug in said bore along the longitudinal axis thereof, means mounted on one of said mating surfaces and relatively movable with respect to the other of said mating surfaces for maintaining a fluid tight seal between said plug and said body in the closed position of said plug and for surrounding the connecting portions of said port and said passages in the open position of said plug, said seal means including a corrosion resistant material of relatively low coefficient of friction with respect to said plug and said body and having a thickness dimension sufficient to maintain said mating surfaces in spaced relation, an elastically compressible sealant interposed between said seal means and said one mating surface to establish a fluid tight seal therebetween, and means operative on said plug to urge said plug in a longitudinal direction creating a radially directed force sufficient to effect a seal between said seal means and said other mating surface, said radially directed force being insufficient to effect a seal between said seal means and said one mating surface in the absence of said interposed sealant for reducing the friction between said seal means and said other mating surface thereby reducing the turning torque required for said operating means.

2. A plug valve for corrosive fluids and the like comprising a body including means defining a bore and ports opening into said bore, a valve plug rotatably received in said bore and having a port therethrough for alignment with said body ports, said plug being of sufficiently smaller radial dimension than said bore to establish an annular clearance between the opposed surfaces thereof, at least one of said opposed surfaces being tapered between about 1° and 5° on a side, means positioned within said annular clearance for surrounding the body ports with said valve in the open position and for establishing a seal preventing fluid flow therethrough with said valve in the closed position, said fluid tight seal means being stationary with respect to one of said plug and bore surfaces and movable relative to the other, said seal means including a corrosion resistant material of relatively low coefficient of friction with respect to said plug and said body and having a thickness dimension at least as great as the dimension of said annular clearance for maintaing the outer surface of said plug spaced from the inner surface of said bore, a corrosion resistant elastically compressible sealant interposed between said seal means and said one surface for establishing a fluid tight seal therebetween, means maintaining said plug in sealed engagement with the mating surface of said sealing means and for creating radial pressure, and said last named means cooperating with the seal means and said sealant to create a radial force insufficient to effect a seal between said seal means and said one surface in the absence of said sealant and being sufficient to establish a seal between said other surface and seal means for reducing the friction between said seal means and said movable surface thereby reducing the turning torque required to move said plug from one position to the other.

3. A plug valve for corrosive fluids and the like comprising a body including means defining a bore extending transversely thereof and ports opening into said bore in angularly spaced relation, a valve plug rotatably received in said bore and having a port therethrough for alignment with said body ports, said plug being of sufficiently smaller radial dimension than said bore to establish an annular clearance between the opposed surfaces thereof, at least one of said opposed surfaces being tapered between about 1° and 5° on a side, means positioned within said annular clearance for surrounding the body ports with said valve in the open position and for establishing a seal preventing fluid flow through said valve in the closed position, said fluid tight seal means being stationary with respect to said bore, said seal means including a corrosion resistant material of relatively low coefficient of friction with respect to said plug at said body and having a thickness dimension at least as great as the dimension of said annular clearance for maintaining the outer surface of said plug spaced from the inner surface of said bore, a corrosion resistant elastically compressible sealant having a low coefficient of friction interposed between said seal means and said bore for establishing a fluid tight seal therebetween, means maintaining said plug is sealed engagement with the mating surface of said sealing means and for creating radial pressure, and said last named means cooperating with the seal means and said sealant to create a radial force insufficient to effect a seal between said seal means and said bore in the absence of said sealant and being sufficient to establish a seal between said plug surface and seal means for reducing the friction between said seal means and said plug surface thereby reducing the turning torque required to move said plug from one position to the other.

4. A plug valve as set forth in claim 3 wherein said seal means include edge portions opposing line pressure and wherein said plug, seal means and body are so constructed that during movement of said plug to the closed position the interior of said plug port is maintained in direct fluid receiving relation and under relatively the same pressure conditions as the inlet port.

5. A plug valve for corrosive ffuids and the like, comprising a metallic body including means defining a conical bore extending transversely thereof and ports opening into said bore in angularly spaced relation, a metallic valve plug rotatably received in said bore and having a port therethrough for alignment with said body ports, said plug being of sufficiently smaller radial dimension than said bore to establish an annular clearance between the opposed surfaces thereof, each of said opposed surfaces being tapered the same amount and between about 1° and 5° on a side, means on one of said opposed surfaces defining a pair of pockets, insert means positioned within said pockets for surrounding the body ports with said valve in the open position and for establishing a seal preventing fluid flow through said valve in the closed position, insert means being stationary with respect to one of said plug and bore surfaces and movable with respect to the other and including a corrosion resistant material of relatively low coefficient of friction with respect to said plug at said body, said insert means having a thickness dimension at least as great as the dimension of said annular clearance for maintaining the outer surface of said plug spaced from the inner surface of said bore, a corrosion resistant elastically compressible sealant having a low coefficient of friction interposed between said insert means and said one surface for establishing a fluid tight seal therebetween, means maintaing said plug in sealed engagement with the mating surface of said insert means and for creating radial pressure, and said last named means cooperating with said insert means and said sealant to create a radial force insufficient to effect a seal between said insert means and said one surface in the absence of said sealant and being sufficient to establish a seal between said other surface and insert means for reducing the friction between said insert means and said movable surface thereby reducing the turning torque required to move said plug from one position to the other.

6. A plug valve for corrosive fluids and the like comprising a metallic valve body including means defining a bore and ports opening into said bore in angularly spaced relation, a metallic valve plug rotatably mounted in said bore and having a passage therethrough adapted for alignment with said body ports, operating means for rotating said plug selectively between open and closed positions, said plug being of sufficiently smaller radial dimension than said bore to establish an annular clearance space between the mating surfaces of said plug and of said bore, each of said mating surfaces being correspondingly tapered in the order of 1° to 5° to provide for variation of said clearance space in response to appropriate movement of said plug in said bore along the longitudinal axis thereof, means in said bore defining a pair of pockets one of which surrounds each said bore port, each said pocket including a communicating expansion chamber and an associated radially extending peripheral wall, insert means mounted in said pockets and relatively movable with respect to the plug surface for maintaining a fluid tight seal between said plug and said body in the closed position of said plug and for surrounding the communicating portions of said port and said passages in the open position of said valve, said insert means including a corrosion resistant material of relatively low coefficient of friction wth respect to said plug and said body and having a thickness dimension at least as great as the dimension of said clearance space to maintain said mating surfaces in spaced relation, a corrosion resistant elastically compressible sealant interposed between said insert means and said bore surface to establish a fluid tight seal therebetween, means operative on said plug to urge said plug in a longitudinal direction creating a radially directed force sufficient to effect a seal between said insert means and said plug surface, said radially directed force being insufficient to effect a seal between said insert means and said bore surface in the absence of said interposed sealant for reducing the friction between said insert means and said plug surface thereby reducing the turning torque required for said operating means.

7. A plug valve for corrosive fluids and the like comprising a metallic rough cast body including means defining a bore extending transversely thereof and ports opening into said bore in angularly spaced relation, a polished metallic valve plug rotatably received in said bore and having a port therethrough for alignment with said body ports, said plug being of sufficiently smaller radial dimension than said bore to establish an annular clearance between the opposed surfaces thereof, each of said opposed surfaces being tapered the same amount between about 1° and 5° on a side, means in said bore defining a pair of pockets one of which surrounds each said body port, each of said pocket including a communicating expansion chamber and an associated radially extending peripheral wall, insert means positioned within each said pocket in said bore for surrounding the body ports for establishing a seal preventing fluid flow through said valve in the closed position, said insert means being of polytetrafluoroethylene and having a thickness dimension sufficient to maintain the outer surface of said plug spaced from the inner surface of said bore, an elastically compressible sealant including finely divided polytetrafluoroethylene interposed between each said insert means and said bore surface in the area of each said pocket for establishing a fluid tight seal therebetween, means maintaining said plug in sealed engagement with the mating surface of each said insert means and for creating radial pressure, and said last named means cooperating with each said insert means and said sealant to create a radial force insufficient to effect a seal between each said insert means and said plug surface in the absence of said sealant and being sufficient to establish a seal between said other surface and each said insert means for reducing the friction between each said insert means and said plug surface thereby reducing the turning torque required to move said plug from one position to the other.

8. A plug valve for corrosive fluids and the like comprising a body including means defining a bore extending transversely thereof and ports opening into said bore in angularly spaced relation, a valve plug rotatably received in said bore and having a port therethrough for alignment with said body ports, said plug being of sufficiently smaller radial dimension than said bore to establish an annular clearance between the opposed surfaces thereof, at least one of said opposed surfaces being tapered between about 1° and 5° on a side, sleeve means positioned within said annular clearance and including high pressure seal areas surrounding said body ports in the open position of said valve and surrounding said plug port in the closed position of said valve, said sleeve means being stationary with respect to one of said plug and bore surfaces and movable with respect to the other, said sleeve means being of a corrosion resistant material of relatively low coefficient of friction with respect to said plug at said body and having a thickness dimension at least as great as the dimension of said annular clearance for maintaining the outer surface of said plug spaced from the inner surface of said bore, a corrosion resistant elastically compressible sealant having a low coefficient of friction interposed between said sleeve means and said one surface for establishing a fluid tight seal therebetween, means maintaining said plug in sealed engagement with the mating surface of said sleeve means and for creating radial pressure, and said last named means cooperating with the sleeve means and said sealant to create a radial force insufficient to effect a seal between said sleeve means and said one surface in the absence of said sealant and being sufficient to establish a seal between said other surface and sleeve means for reducing the friction between said sleeve means and said movable surface thereby reducing the turning torque required to move said plug from one position to the other.

9. A plug valve as set forth in claim 8 wherein said seal means include edge portions opposing line pressure and wherein said plug, seal means and body are so constructed that during movement of said plug to the closed position the interior of said plug port is maintained in direct fluid receiving relation and under relatively the same pressure conditions as the inlet port.

10. A plug valve for corrosive fluids and the like comprising a body including means defining a bore extending transversely thereof and ports opening into said bore in angularly spaced relation, a valve plug rotatably received in said bore and having a port therethrough for alignment with said body ports, said plug being of sufficiently smaller radial dimension than said bore to establish an annular clearance between the opposed surfaces thereof, at least one of said opposed surfaces being tapered between about 1° and 5° on a side, means in said bore defining a pattern of lands surrounding said body ports and a pair of spaced lands extending circumferentially above and below said body ports, sleeve means received within said bore and stationary with respect thereto and cooperating with said lands and said plug to provide high pressure seal areas surrounding said body ports and circumferential high pressure seal areas above and below said body ports, said sleeve means being a corrosion resistant material of relatively low coefficient of friction with respect to said plug at said body and having a thickness dimension sufficient to maintain the outer surface of said plug spaced from the inner surface of said bore, a corrosion resistant elastically compressible sealant having a low coefficient of friction interposed between said sleeve means and said bore surface for establishing a fluid tight seal therebetween, means maintaining said plug in sealed engagement with the mating surface of said sealing means and for creating radial pressure, and said last named means cooperating with said sleeve means and said sealant to create a radial force insufficient to effect a seal between said sleeve means and said one surface in the absence of said sealant and being sufficient to establish a seal between said other surface and sleeve means for reducing the friction between said sleeve means and said movable surface thereby reducing the turning torque required to move said plug from one position to the other.

11. A plug valve for corrosive fluids and the like comprising a valve body including means defining a bore and ports opening into said bore in angularly spaced relation, a valve plug rotatably mounted in said bore and having a passage therethrough adapted for alignment with said body ports, operating means for rotating said plug selectively between open and closed positions, said plug being of sufficiently smaller radial dimension than said bore to establish an annular clearance space between the mating surfaces of said plug and of said bore, at least one of said mating surfaces being tapered in the order of 1° to 5° to provide for variation of said clearance space in response to appropriate movement of said plug in said bore along the longitudinal axis thereof, means in said bore defining spaced pockets between said body ports and a pair of spaced circumferential grooves above and below said body ports, sleeve means received within said clearance and including portions received within said pockets and said grooves and cooperating with said plug and said body to provide respectively low pressure seal areas and means preventing movement of said sleeve during temperature cycling of said valve, said sleeve means including a corrosion resistant material of relatively low coefficient of friction with respect to said plug and said body and having a thickness dimension at least as great as the dimension of said clearance space to maintain said mating surfaces in spaced relation, a corrosion resistant elastically compressible sealant interposed between said sleeve means and said bore surface to establish a fluid tight seal therebetween, means operative on said plug to urge said plug in a longitudinal direction creating a radially directed force sufficient to effect a seal between said sleeve means and said other mating surface, said radially directed force being insufficient to effect a seal between said sleeve means and said bore surface in the absence of said interposed sealant for reducing the friction between said sleeve means and said plug surface thereby reducing the turning torque required for said operating means.

12. A plug valve for corrosive fluids and the like comprising a metallic valve body including means defining a bore and ports opening into said bore in angularly spaced relation, a polished metal valve plug rotatably mounted in said bore and having a passage therethrough adapted for alignment with said body ports, operating means for rotating said plug selectively between open and closed positions, said plug being of sufficiently smaller radial dimension than said bore to establish an annular clearance space between the mating surfaces of said plug and of said bore, at least one of said mating surfaces being tapered in the order of 1° to 5° to provide for variation of said clearance space in response to appropriate movement of said plug in said bore along the longitudinal axis thereof, means in said bore defining a pattern of lands surrounding said body ports and a pair of spaced lands extending circumferentially above and below said pockets, means in said bore defining pockets between said surrounding lands and said body ports and a pair of spaced circumferential grooves disposed in said bore with said circumferential lands therebetween, sleeve means received within said clearance and including portions thereof received within said pockets and grooves to provide respectively low pressure seal areas and means preventing movement of said sleeve during temperature cycling of said valve, said sleeve cooperating with said pattern of lands and said spaced lands and said plug to provide respectively high pressure seal areas surrounding said body ports and circumferential high pressure seal areas above and below said body ports, said sleeve means being a corrosion resistant material of relatively low coefficient of friction with respect to said plug and said body and having a thickness dimension at least as great as the dimension of said clearance space to maintain said mating surfaces in spaced relation, a corrosion resistant elastically compressible sealant interposed between said sleeve means and said bore surface to establish a fluid tight seal therebetween, means operative on said plug to urge said plug in a longitudinal direction creating a radially directed force sufficient to effect a seal between said sleeve means and said plug surface, said radially directed force being insufficient to effect a seal between said sleeve means and said bore surface in the absence of said interposed sealant for reducing the friction between said sleeve means and said plug surface thereby reducing the turning torque required for said operating means.

References Cited by the Examiner

UNITED STATES PATENTS

| | | | |
|---|---|---|---|
| 3,128,987 | 4/1964 | O'Connor | 251—317 X |
| 3,199,835 | 8/1965 | Freed | 251—309 |
| 3,206,163 | 9/1965 | Freed | 251—309 |
| 3,206,530 | 9/1965 | Boteler | 137—375 X |
| 3,216,697 | 11/1965 | Holmberg | 251—317 X |

M. CARY NELSON, *Primary Examiner.*

H. KLINKSIEK, *Examiner.*